March 4, 1947.    M. L. OSBORN    2,416,881
PRESSURE REGULATING VALVE
Filed July 17, 1945
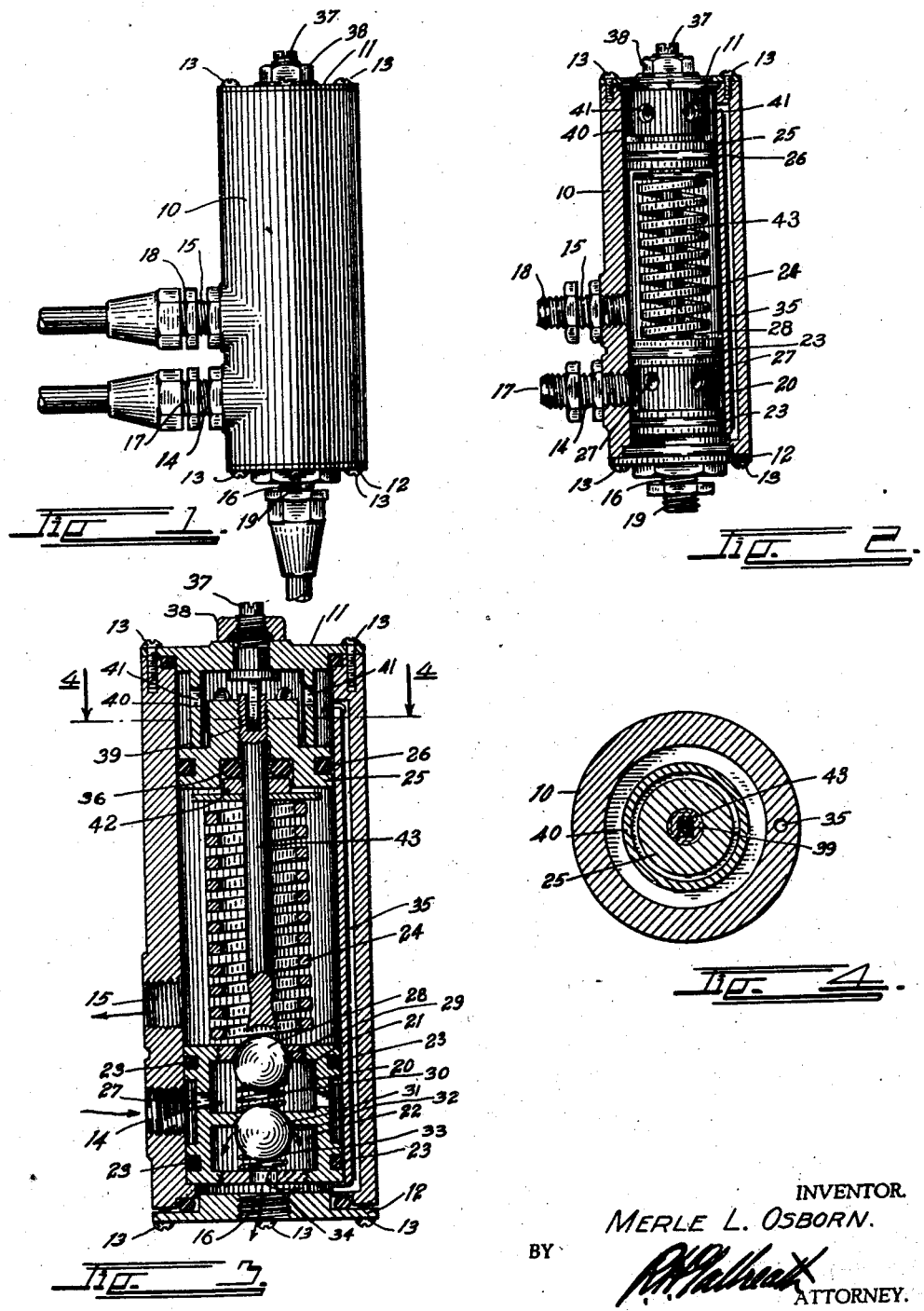
INVENTOR.
MERLE L. OSBORN.
BY
ATTORNEY.

Patented Mar. 4, 1947

2,416,881

UNITED STATES PATENT OFFICE 2,416,881

PRESSURE REGULATING VALVE

Merle L. Osborn, Long Beach, Calif.

Application July 17, 1945, Serial No. 605,584

5 Claims. (Cl. 137—53)

This invention relates to a hydraulic pressure regulating valve and has for its principal object the provision of a valve of this character which can be economically manufactured, which will be positive and accurate in its operation and in which the working parts can be quickly and easily removed and replaced should damage occur.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved automatic pressure regulating valve;

Fig. 2 is a similar view with the outer housing cut away to illustrate the internal mechanism;

Fig. 3 is a vertical cross-section through the improved valve; and

Fig. 4 is a cross-section, taken on the line 4—4 Fig. 3.

The improved pressure regulating valve is enclosed in a tubular housing 10, the upper and lower extremities of which are closed by means of top and bottom end caps 11 and 12, respectively, secured thereto by means of suitable attachment screws 13. The side of the housing is provided with a supply inlet 14 and a return port 15. The end cap 12 is provided with a controlled pressure outlet 16. Suitable nipples 17, 18 and 19 are threaded into the inlet 14, port 15 and outlet 16, respectively, for the attachment of any desired hydraulic tubing or piping. The pressure inlet 14 is connected with any suitable source of hydraulic fluid under pressure and the opening 16 is connected with the device or devices using the hydraulic fluid pressure.

The invention is designed to maintain a preset uniform pressure at the outlet 16 regardless of variations in pressure at the inlet 14 and demands of the device or devices connected thereto. This is accomplished by slidably mounting a valve cage 20 within the housing 10. The cage is sealed adjacent its top and bottom to the internal wall of the housing 10 by means of "neoprene" sealing rings 23 or by any other suitable sealing means and is constantly urged downwardly in the housing 10 by means of a compression spring 24. The spring 24 acts against a piston member 25 slidably mounted in the upper portion of the housing 10 and sealed to the walls thereof by means of a suitable sealing ring 26.

The cage contains an upper chamber 21 and a lower chamber 22. Fluid from the supply inlet 14 flows through ports 27 in the cage to the upper chamber 21. This fluid is prevented from flowing into the upper portion of the housing 10 by means of a ball check valve 28 acting against a valve seat 29. The ball valve 28 is constantly urged toward its seat 29 by means of a valve spring 30. The fluid can flow, however, to the lower chamber 22 by forcing a second ball check valve 31 from its seat 32 in the cage 20. The second ball check valve is constantly urged against the seat 32 by means of a second valve spring 33 which prevents return of fluid to the upper chamber 21. The fluid escapes from the lower chamber 22 through an escape port 34 into the lower portion of the housing to supply the outlet 16.

A portion of the fluid from the lower portion of the housing 10 flows through a longitudinal channel 35 in the wall of the housing 10 to a pressure chamber above the piston member 25. As the pressure builds up at the outlet 16, the cage 20 and the piston 25 are forced toward each other compressing the spring 24. Eventually a point will be reached where a valve stem 43 carried by the piston 25 will contact the ball 28 and force it from its seat 29. This allows the excess fluid to flow into the interior of the housing 10 and through the return port 15 back to the reservoir or pressure pump supplying the original fluid.

The stem 43 is threaded through the piston 25 and is sealed therein by means of a suitable stem sealing gasket 36 and washer 42. The pressure at which the stem 43 will force the ball 28 from its seat can be preset by threading the stem further into or out of the piston 25 so as to decrease or increase its effective length. This presetting can be accomplished from the exterior of the housing through the medium of a rotatable adjusting stud 37 extending through the top cap 11 and provided with a suitable jam nut 38 for setting it in any desired position. The inner extremity of the stud terminates in a screwdriver like blade 39 which enters a slot in the upper extremity of the stem 43 for rotating the latter. The stem may move longitudinally of the blade 39.

A stop sleeve 40 extends inwardly from the top cap to limit the upward movement of the piston 25. This sleeve is provided with suitable openings 41 to allow the fluid pressure to equalize within and without the sleeve.

The operation of the device is believed to be apparent from the above. The adjusting stud 37 is set for any desired hydraulic pressure, say, 100 p. s. i. When the pressure at the outlet 16 reaches 100 p. s. i., the piston 25 and the cage 20 will have compressed the spring 24 to a point where the stem 43 will contact the ball 28. Any further increase in pressure at the outlet 16 will cause the stem to force the ball 28 from its seat to allow the excess fluid pressure to discharge through the return port 15.

Should any of the internal mechanism become damaged or clogged, the entire assembly may be quickly removed and replaced simply by removing the screws 13 in the upper cap. The improved pressure regulating valve is more particularly designed for use on aircraft hydraulic systems. The pressure regulating valves on these systems have been a source of trouble and danger for should they fail the entire hydraulic control system of the aircraft fails. This improved valve is very rarely subjected to failure but should such failure occur, due to a chip of metal or other foreign material lodging under the ball valves, it is possible to remove the entire internal assembly and replace it with a spare assembly while the aircraft is in flight. The time required should not exceed five minutes and the only tool necessary is a screw driver.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A pressure regulating valve comprising: a housing having a cylindrical bore; a valve cage; a piston, said piston and cage being longitudinally movable in said bore; a compression spring urging said cage and said piston away from each other; a pressure inlet positioned in said housing opposite said cage; a valve in said cage normally preventing fluid from flowing into said bore toward said piston; a stem projecting from said piston toward said latter valve and positioned to force the latter from its seat when said spring has been compressed a predetermined distance; a pressure outlet from said housing below said cage; a channel connecting said pressure outlet with said bore above said piston to apply pressure to the latter; and a return port in said housing intermediate said piston and said cage.

2. A pressure regulating valve comprising: a housing having a cylindrical bore; a valve cage; a piston, said piston and cage being longitudinally movable in said bore; a compression spring urging said cage and said piston away from each other; a pressure inlet positioned in said housing opposite said cage; a valve in said cage normally preventing fluid from flowing into said bore toward said piston; a stem projecting from said piston toward said latter valve and positioned to force the latter from its seat when said spring has been compressed a predetermined distance; a pressure outlet from said housing below said cage; a channel connecting said pressure outlet with said bore above said piston to apply pressure to the latter; a return port in said housing intermediate said piston and said cage; and a check valve in said cage for preventing the return of fluid from said pressure outlet to said pressure inlet.

3. A pressure regulating valve comprising: a housing having a cylindrical bore; a valve cage; a piston, said piston and cage being longitudinally movable in said bore; a compression spring urging said cage and said piston away from each other; a pressure inlet positioned in said housing opposite said cage; a valve in said cage normally preventing fluid from flowing into said bore toward said piston; a stem projecting from said piston toward said latter valve and positioned to force the latter from its seat when said spring has been compressed a predetermined distance; a pressure outlet from said housing below said cage; a channel connecting said pressure outlet with said bore above said piston to apply pressure to the latter; a return port in said housing intermediate said piston and said cage; and means on the exterior of said housing for regulating the extension of said stem.

4. A pressure regulating valve comprising: a housing having a cylindrical bore; a valve cage; a piston, said piston and cage being longitudinally movable in said bore; a compression spring urging said cage and said piston away from each other; a pressure inlet positioned in said housing opposite said cage; a valve in said cage normally preventing fluid from flowing into said bore toward said piston; a stem projecting from said piston toward said latter valve and positioned to force the latter from its seat when said spring has been compressed a predetermined distance; a pressure outlet from said housing below said cage; a channel connecting said pressure outlet with said bore above said piston to apply pressure to the latter; and a return port in said housing intermediate said piston and said cage, said stem being threaded through said piston; and a member rotatable from the exterior of said housing for rotating said stem in its threads.

5. A pressure regulating valve comprising: a housing having a cylindrical bore; a valve cage; a piston, said piston and cage being longitudinally movable in said bore; a compression spring urging said cage and said piston away from each other; a pressure inlet positioned in said housing opposite said cage; a valve in said cage normally preventing fluid from flowing into said bore toward said piston; a stem projecting from said piston toward said latter valve and positioned to force the latter from its seat when said spring has been compressed a predetermined distance; a pressure outlet from said housing below said cage; a channel connecting said pressure outlet with said bore above said piston to apply pressure to the latter; a return port in said housing intermediate said piston and said cage; and a cap closing said bore, all of the elements in said bore being removable by removal of said cap.

MERLE L. OSBORN.

REFERENCES CITED

The following references are of record in the file of this patent:

UNITED STATES PATENTS

| Number | Name | Date |
|---|---|---|
| 1,212,951 | Higinbotham | Jan. 16, 1917 |
| 2,320,686 | Waseige | June 1, 1943 |
| 2,372,016 | Rockwell | Mar. 20, 1945 |